United States Patent [19]

Newcombe, Jr. et al.

[11] Patent Number: 4,670,886
[45] Date of Patent: Jun. 2, 1987

[54] RECEIVER/DRIVER/REPEATER INTERFACE

[75] Inventors: William R. Newcombe, Jr., Buffalo Grove; Daniel G. Prysby, Cook, both of Ill.; Michael E. Sanderson, Indianapolis, Ind.; David S. Schiller, Lake Zurich, Ill.

[73] Assignee: Honeywell Inc., Minneapolis, Minn.

[21] Appl. No.: 727,971

[22] Filed: Apr. 26, 1985

[51] Int. Cl.⁴ ............................................. H04L 25/24
[52] U.S. Cl. ...................................... 375/3; 178/70 R; 178/71 R
[58] Field of Search .................... 375/3, 4; 455/15, 79; 370/26, 29, 97; 179/170 R, 170 F, 170 T, 170.2; 178/70 R, 70 TS, 71 R, 71 N, 71 H

[56] References Cited

U.S. PATENT DOCUMENTS

| | | | |
|---|---|---|---|
| 2,109,026 | 2/1938 | McCann | 178/71 N |
| 3,586,793 | 6/1971 | Neal | 178/70 R |
| 4,154,978 | 5/1979 | Tu | 178/71 R |

OTHER PUBLICATIONS

"ICs Extend RS-422 to Multistation Applications", Dak Pippenger, Electronic Design News, 3/21/85, pp. 181-188.

Primary Examiner—Benedict V. Safourek
Attorney, Agent, or Firm—Trevor B. Joike; John P. Sumner

[57] ABSTRACT

A repeater circuit for repeating data on a communication channel, the repeater circuit having two receiver/driver circuits arranged in repeating fashion and having a control circuit for maintaining the receiver/driver circuits in a listening mode, for switching one of the receiver/driver circuits to a transmitting mode when the other of the receiver/driver circuits receives data, and for maintaining the switched receiver/driver circuits switched by an amount of time required for the bus connected to the switched receiver/driver circuit to return to its normal state after the cessation of transmitted data.

7 Claims, 5 Drawing Figures

RECEIVER/DRIVER/REPEATER INTERFACE

BACKGROUND OF THE INVENTION

The present invention relates to a multifunctional repeater interface which can act as a repeater on a bidirectional communication bus and can interface various types of communication equipment.

As the proliferation of communication equipment increases, there is a concomitant increasing need for interfacing various types of communication equipment together. The need for such interfaces is also increased because of the increasing number of transmission standards which have been and are being adopted. Such standards dictate communication speeds, line distances, voltage levels, transmission wire characteristics, and receiver/driver characteristics. It becomes important, therefore, to provide interfaces so that equipment which normally is configured to communicate over one type of bus and with similar type of equipment can in fact communicate over other types of buses and with other types of equipment.

Furthermore, bus standards are now being adopted which allow for bidirectional data communication over the same pair of wires whereas previous standards and/or systems required a separate pair of wires for bidirectional data communication. Thus, if repeaters are to be designed for data communication systems, it is desirable that these repeaters be functional over a single pair of wires for bidirectional data flow and at the same time be constructed so that the turn around time of typical data buses does not allow for data traveling through the repeater in one direction to be recirculated through the repeater such that the data is repeatedly transmitted in both directions.

SUMMARY OF THE INVENTION

The present invention accomplishes these objectives by providing a repeater circuit for repeating data from one bus to another bus, the circuit including a first pair of terminals for connection to a first bus, a second pair of terminals connected to the second bus, a first receiver/driver having a receiver and a driver, a second receiver/driver having a receiver and a driver, a first connection circuit for connecting the first receiver/driver to the first pair of terminals, a second connection circuit for connecting the second receiver/driver to the second pair of terminals, and a controller connected to the first and second receiver/drivers for maintaining the first and second receiver/drivers in a normal listening mode, for maintaining one of the receiver/drivers in the listening mode when data appears on the bus associated with that receiver/driver and for switching the other of the receiver/drivers to a transmit mode, the controller circuit including a delay circuit for preventing the other of the receiver/drivers from returning to the listening mode until the bus associated with the other of the receiver/drivers returns to a normal state, the delay preventing data supplied by the driver of the other of the receiver/drivers from being received by the receiver of the other of the receiver/drivers.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
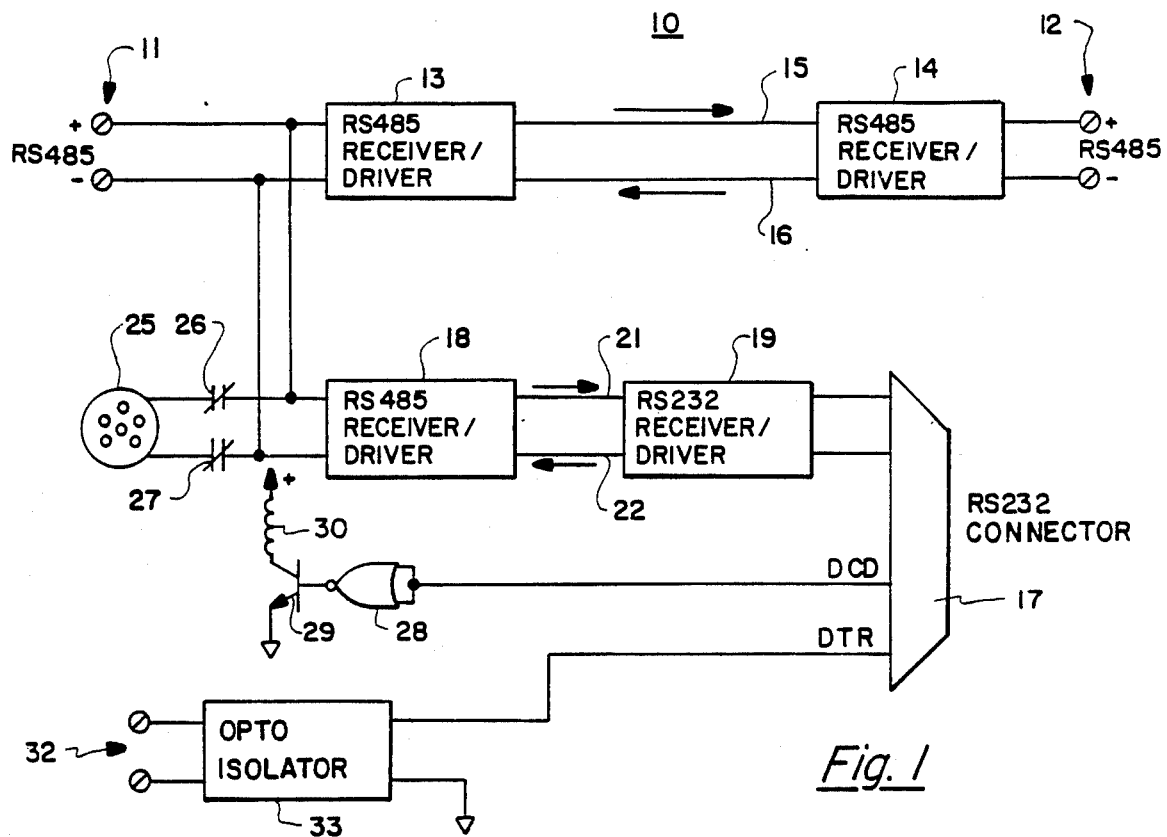
FIG. 1 shows a block diagram of the present invention.

As shown in FIG. 1, interface 10 is comprised of terminals 11 for connecting interface 10 to a communication bus such as an RS485 type of communication bus and terminals 12 for connecting interface 10 to a second communication bus such as an RS485 communication bus. Connected to terminals 11 is a receiver/driver 13 and connected to terminals 12 is a receiver/driver 14. Line 15 connects receiver/driver 13 to receiver/driver 14 for data flow in the indicated direction and line 16 connects receiver/driver 14 to receiver/driver 13 for data flow in the other direction. Receiver/drivers 13 and 14 perform a repeating function between the bidirectional data buses connected to terminals 11 and 12.

Accordingly, bus repeater 13–14 is used to extend the length of the communication bus in the system for which it is performing the repeating function. The receiving receiver/driver 13 or 14 converts the balanced bus signals, in this specific case the balanced RS485 signals, to TTL level signals and these TTL level signals are then used to drive the other repeater/driver 13 or 14 which in turn converts these TTL level signals to balanced bus signals. Signals are converted from either of the buses connected to terminals 11 or 12 and retransmitted on the other bus.

Interface 10 also provides an interface from one type of standard to a second type of standard. Specifically, interface 10 is configured to interface an RS232 terminal connected to RS232 connector 17 to an RS485 type of bus. Accordingly, receiver/driver 18 is connected to terminals 11 and receiver/driver 19 is connected to connector 17. Line 21 connects receiver/driver 18 to receiver/driver 19 for data flow in the indicated direction and line 22 connects receiver/driver 19 to receiver/driver 18 for data flow in the other direction. Receiver/driver 18 converts the balanced bus signals to TTL level signals which drive receiver/driver 19 which in turn converts the TTL level signal to the proper signal levels for use by the terminal connected to connector 17. The signals received from the terminal connected to connector 17 are likewise converted by receiver/driver 19 to TTL level signals which are then reconverted by receiver/driver 18 for transmission over the bus connected to terminals 11 and 12.

Socket connector 25 is provided connected to terminals 11 through normally closed contacts 26 and 27 to allow a local hand-held terminal to be used while there is no connection to a terminal such as a personal computer through connector 17. If the operator at the remote personal computer connected to connector 17 connects to interface 10, interface 10 will receive a data carrier detect (DCD) signal which is inverted by NOR gate 28 to turn on transistor 29 for energizing relay 30 to open contacts 26 and 27 to disconnect the local terminal connected to socket 25 from the bus connected to terminals 11 and 12. Thus, two terminals are not on the bus at the same time which could cause transmission problems if both tried to transmit simultaneously.

Interface 10 also has provision for allowing an alarm at a local controller connected to interface 10 to initiate a modem connection back to the terminal (e.g. a personal computer) connected to connector 17. Thus, alarm contacts 32 are provided which can be connected to corresponding contacts at a local controller. Alarm contacts 32 are connected through optoisolator 33 to the DTR (data terminal ready) input at connector 17. If an alarm occurs at any controller, its alarm contacts are energized for energizing alarm contacts 32 which can be interpreted by an auto dial/auto answer modem as a request to auto dial. This modem will then dial the number of the remote personal computer which auto answers. Accordingly, the remote personal computer can communicate with the controller and receive the alarm information.

Figure 2:
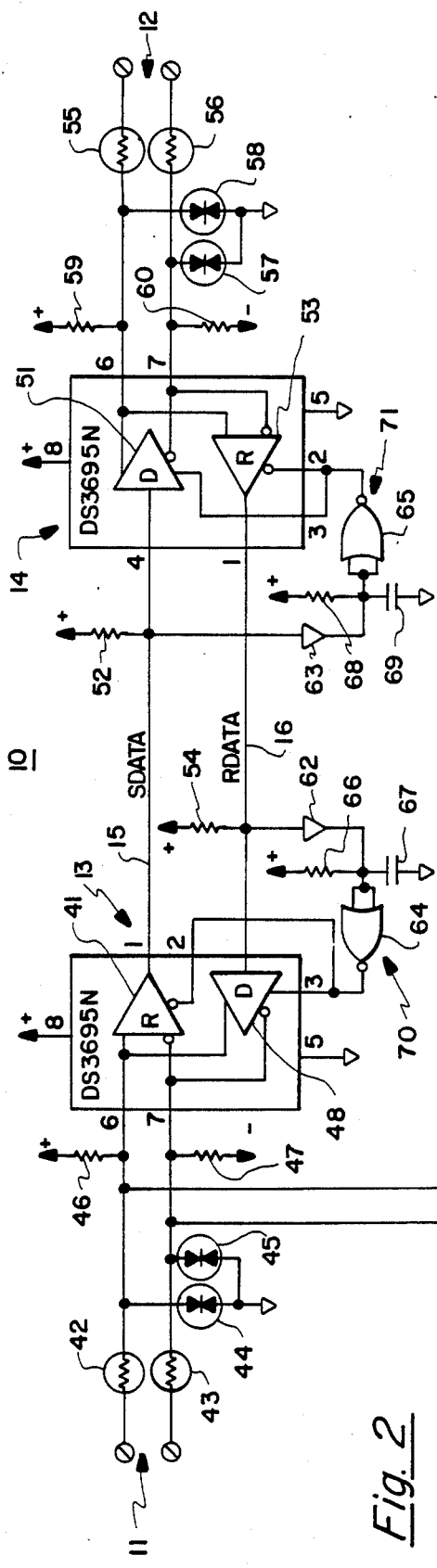
FIG. 2 shows a detailed circuit schematic of the repeater interface of the present invention; and, FIGS. 3–5 show systems in which the repeater interface of the present invention can be used.
Figure 2:
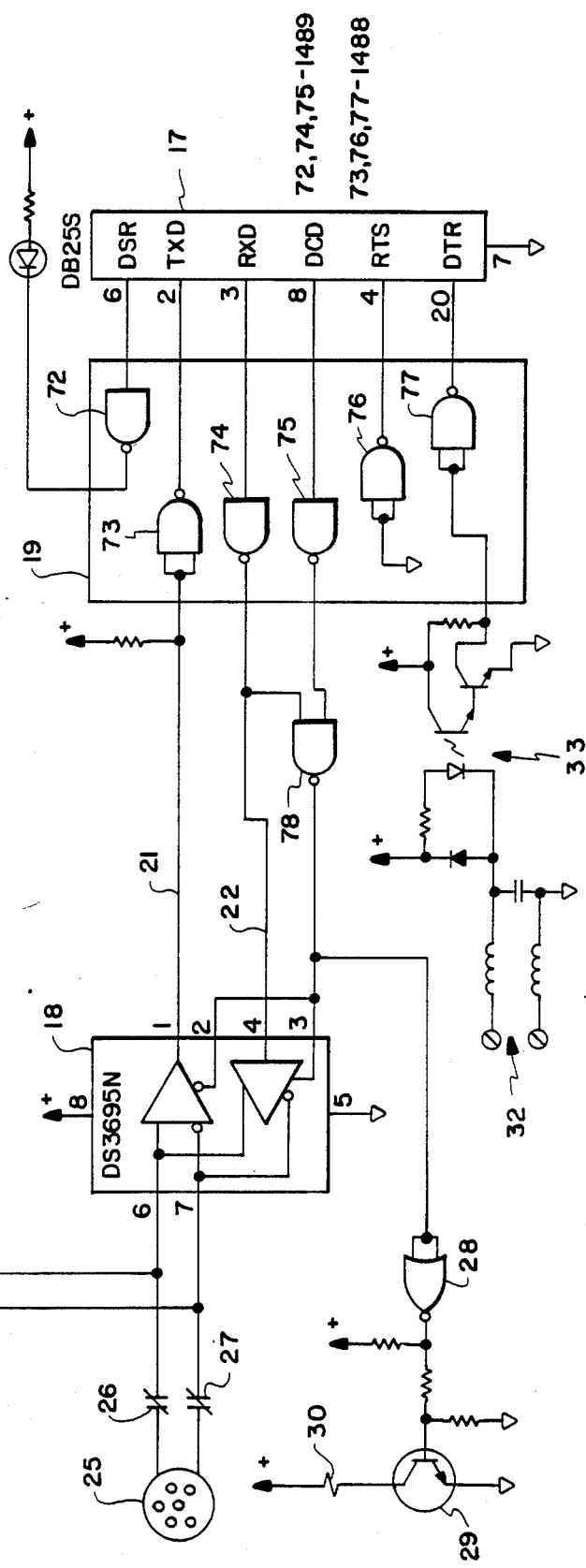

FIG. 2 shows interface 10 in more detail. Receiver/driver 13 comprises receiver 41 connected to terminals 11 through current limiting, self-heating resistors 42 and 43. The inputs to receiver 41 are also connected to ground through voltage breakdown devices 44 through 45. Devices 42-45 provide over current and over voltage protection. One input of receiver 41 is connected to a positive source through pull up resistor 46 and the other input of receiver 41 is connected to a negative source through pull down resistor 47. Each output of driver 48 is connected to a corresponding input of receiver 41.

The output of receiver 41 is connected by line 15 to the input of driver 51 of receiver/driver 14. Line 15 is connected to a positive source through pull up resistor 52. The input of driver 48 of receiver/driver 13 is connected by line 16 to the output of receiver 53 of receiver/driver 14. Line 16 is connected to a positive source through pull up resistor 54. The outputs of driver 51 are connected to terminals 12 through current limiting, self-heating resistors 55 and 56 and are also connected to ground through voltage breakdown devices 57 and 58. Devices 55-58 provide over current and over voltage protection. One output of driver 51 is connected to a positive source through pull up resistor 59 and the other output is connected to a negative source through pull down resistor 60. The inputs of receiver 53 are connected to the outputs of driver 51.

Control or delay networks 70 and 71 comprising buffers 62 and 63 and inverting NOR gates 64 and 65 together with RC networks 66-67 and 68-69 respectively are provided for controlling the transmitting or receiving modes of receiver/drivers 13 and 14. Specifically, line 16 is connected through buffer 62 to the junction of resistor 66 and capacitor 67, resistor 66 and capacitor 67 being connected in series between a positive potential and a reference potential. The junction between resistor 66 and capacitor 67 is also connected through gate 64 to control terminals of receiver 41 and driver 48. Likewise, line 15 is connected through buffer 63 to the junction of resistor 68 and capacitor 69 which are connected in series between a positive potential and a reference potential. This junction is connected through gate 65 to the control terminals of driver 51 and receiver 53.

Delay circuit 70 normally maintains driver 48 off and receiver 41 on such that receiver/driver 13 is maintained in a listening or receiving mode. Likewise, delay circuit 71 maintains driver 51 off and receiver 53 on such that driver/receiver 14 is maintained in a receiving or listening mode. If data is received at terminals 12, this data is received on line 16 through receiver 53. In response to data on line 16, delay network 70 turns driver 48 on and turns receiver 41 off. Thus, receiver/driver 14 is maintained in a receiving mode but receiver/driver 13 is switched to a driving or transmitting mode to repeat data received at terminals 12 to terminals 11.

Alternately, data received at terminals 11 are supplied to line 15 by receiver 41. The data operate through delay network 71 to switch off receiver 53 and switch on driver 51. Accordingly, receiver/driver 13 is maintained in the receiving or listening mode and receiver/driver 14 is switched to the transmitting or driving mode to repeat data received at terminals 11 to terminals 12.

Delay networks 70 and 71 provide a delay so that whichever driver 48 or 51 has been conditioned to pass data at their inputs is not switched off instantaneously. This delay allows driver 48 or 51 to drive their associated buses to the normal state. Once the transmission of data over the bus has ended, each line of the bus must return to its normal state. Accordingly, the line connected to upper terminal 11 in FIG. 2 must return to its normal high state through pull up resistor 46 and the other line connected to lower terminal 11 must return to its normal negative state through pull down resistor 47. Similarly, the lines connected to terminals 12 must be allowed to return to their normal states. Line capacitance delays the return of the lines of the bus to their normal states. Delay networks 70 and 71 allow sufficient time for the buses to return to their normal states and prevent data on the line from being received by the receiver of the receiver/driver which was transmitting data. For example, if receiver/driver 13 is transmitting data, driver 48 is conditioned to transmit data to terminals 11 and receiver 41 is conditioned to inhibit data at terminals 11 from being supplied to line 15. If receiver/driver 13 is immediately switched to its receive mode after it transmits a data bit, receiver 41 would immediately be switched to its receive mode. Since the line capacitance will maintain the data bit on the bus connected to terminals 11 for an amount of time determined by line capacitance, an immediate switching off of driver 48 and on of receiver 41 will allow the data bit on bus 11 to be transmitted back through receiver 41 which will then switch on driver 51 and switch off receiver 53 to drive the bus connected to terminals 12. Line capacitance of bus 12 will then maintain that data bit on the line so that when driver 51 switches off and receiver 53 switches on the data bit will be transmitted back over line 16. The data bit can be recirculated through the repeater for a substantial amount of time. Accordingly, delay circuits 70 and 71 are provided so that the driver 48 or 51 which last transmitted a data bit and its associated receiver 41 or 53 will be maintained in their previous states for an amount of time to allow the lines of the bus connected to terminals 11 and 12 to return to their normal states. Since receivers 41 and 53 are inhibited during this delay, they cannot receive data being transmitted by their associated drivers.

Also as shown in FIG. 2, connector 17 is connected through gates 72-77 which make up receiver/driver 19 to receiver/driver 18. Moreover, RXD terminal 3 and DCD terminal 8 of connector 17 are combined by NAND gate 78 for providing the input to gate 28 for controlling the connection of socket 25. Moreover, optoisolator 33 is shown in more detail for connecting terminals 32 to DTR terminal 20 of connector 17.

Figure 3:
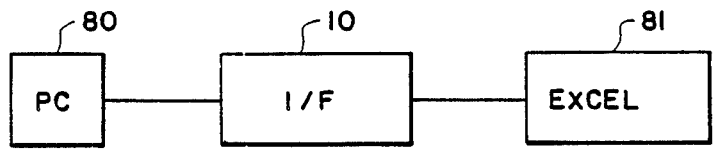
Figure 4:
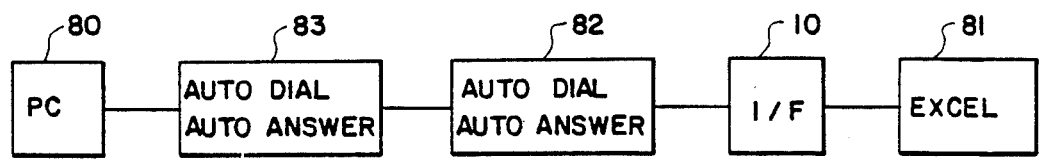
Figure 5:
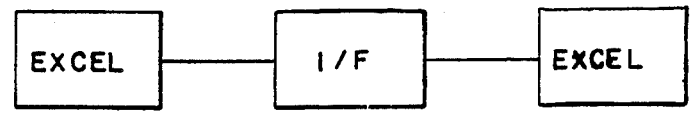

FIGS. 3-5 show some of the ways in which interface 10 can be used in a communication system. For example, interface 10 can be used to connect a terminal such as personal computer 80 to a controller such as a Honeywell EXCEL controller 81 by connecting terminal 80 to connector 17 and by connecting the EXCEL controller 81 to the RS485 bus connected to terminals 11. FIG. 4 shows a way in which the interface can be used to interface a controller such as a Honeywell EXCEL controller to a remote terminal such as a remote personal computer. In this case, the EXCEL controller is connected to terminals 11 of interface 10 by an RS485 bus and an auto dial/auto answer modem 82 is connected to port 17 of interface 10. The auto dial/auto answer modem may then be connected through the telephone lines to a second auto dial/auto answer modem 83 which in turn is connected to the remote terminal 80. As another possibility shown in FIG. 5, interface 10 can be used as a repeater between two EXCEL controllers 84 and 85 by connecting EXCEL controller 84 to terminals 11 of interface 10 by way of an RS485 bus and by connecting EXCEL controller 85 to terminals 12 of interface 10 by way of an RS485 bus.

The embodiments of the invention in which an exclusive property or right is claimed are defined as follows:

1. A repeater circuit for repeating data from one RS485 type bus to another RS485 type bus comprising:
   a first pair of terminals for connection to a first RS485 type bus;
   a second pair of terminals for connection to a second RS485 type bus;
   first receiver/driver means having a receiver and a driver;
   second receiver/driver means having a receiver and a driver;
   first connecting means for connecting said first receiver/driver means to said first pair of terminals;
   second connecting means for connecting said second receiver/driver means to said second pair of terminals;
   control means connected to said first and second receiver/driver means for maintaining said first and second receiver/driver means in a normal listening mode, for maintaining one of said receiver/driver means in said listening mode when data appears on the bus associated with said one of said receiver/driver means and for switching the other of said receiver/driver means to a transmit mode, said control means including delay means for returning to said listening mode until the bus associated with said other of said receiver/driver means returns to a normal state, said delay preventing data supplied by the driver of said other of said receiver/driver means from being received by the receiver of said other of said receiver/driver means; and
   a third receiver/driver means for connection to one of said pair of terminals, an RS232 receiver/driver means for connection to an RS232 port, and connecting means connecting said third receiver/driver means to said RS232 receiver/driver means.

2. The circuit of claim 1 wherein said receiver of said first receiver/driver means has a pair of inputs each of which is connected by said first connecting means to a corresponding one of said first pair of terminals and said driver of said first receiver/driver means has a pair of outputs each of which is connected to a corresponding one of said inputs of its associated receiver, said driver of said second receiver/driver means has a pair of outputs each of which is connected by said second connecting means to a corresponding one of said second pair of terminals and said receiver of said second receiver/driver means has a pair of inputs each of which is connected to a corresponding one of said outputs of its associated driver, said receiver of said second receiver/driver means having an output connected to an input of said driver of said first receiver/driver means and said receiver of said first receiver/driver means having an output connected to an input of said driver of said second receiver/driver means.

3. The circuit of claim 2 wherein said delay means comprises a first delay circuit connected from said output of said receiver of said second receiver/driver means to a control terminal of said receiver and said driver of said first receiver/driver means for maintaining said first receiver/driver means in a normal listening mode and for switching said first receiver/driver means to a transmit mode when data is received by said second receiver/driver means from said second pair of terminals, and a second delay circuit connected from the output of said receiver of said first receiver/driver means to a control terminal of said receiver and said driver of said second receiver/driver means for maintaining said second receiver/driver means in a listening mode and for switching said second receiver/driver means to a transmit mode when data is received at said first pair of terminals, said first and second delay circuits inhibiting their respective receivers from receiving data transmitted by their associated drivers and for delaying their associated receivers from switching back to a listening mode after transmission of data until the buses associated therewith return to their normal states.

4. The circuit of claim 1 further comprising a socket for receiving a portable terminal and a relay means for disconnecting said socket when a terminal is connected to said RS232 port.

5. A repeater circuit for repeating data from one bus to another bus comprising:
   a first pair of terminals for connection to a first bus;
   a second pair of terminals for connection to a second bus;
   first receiver/driver means including a receiver having a pair of inputs and an output and a driver having an input and a pair of outputs;
   second receiver/driver means including a receiver having a pair of inputs and an output and a driver having an input and a pair of outputs;
   first connecting means for connecting each of said pair of inputs of said receiver of said first receiver/driver means and each of said pair of outputs of said driver of said first receiver/driver means to a corresponding one of said first pair of terminals;
   second connecting means for connecting each of said pair of outputs of said driver of said second receiver/driver means and each of said pair of inputs of said receiver of said second receiver/driver means to a corresponding one of said second pair of terminals;
   third connecting means for connecting said output of said receiver of said first receiver/driver means to said input of said driver of said second receiver/driver means;
   fourth connecting means for connecting said output of said receiver of said second receiver/driver means to said input of said driver of said first receiver/driver means;
   first delay means connected to said fourth connecting means and to a control terminal of said receiver and said driver of said first receiver/driver means for maintaining said first receiver/driver means in a listening mode and for switching said first receiver/driver means to a transmitting mode when data is transmitted from said second receiver/driver means to said first receiver/driver means through said fourth connecting means and for delaying switching of said first receiver/driver means to said listening mode for an amount of time necessary for said bus connected to said first pair of terminals to return to its normal state after transmission of data to said first pair of terminals;

second delay circuit means connected from said third connecting means to a control terminal of said receiver and said driver of said second receiver/driver means for maintaining said second receiver/driver means in a listening mode and for switching said second receiver/driver means to a transmitting mode when data is transmitted from said first receiver/driver means to said second receiver/driver means through said third connecting means and for delaying switching of said second receiver/driver means to said listening mode for an amount of time necessary for said bus connected to said second pair of terminals to return to its normal state after transmission of data to said second pair of terminals; and a third receiver/driver means for connection to one of said pair of terminals, and RS232 receiver/driver means for connection to an RS232 port, and connecting means connecting said third receiver/driver means to said RS232 receiver/driver means.

6. The circuit of claim 5 further comprising a socket for receiving a portable terminal and a relay means for disconnecting said socket when a terminal is connected to said RS232 port.

7. A repeater circuit for repeating data from one bus to another bus comprising:
   a first pair of terminals for connection to a first bus;
   a second pair of terminals for connection to a second bus;
   first receiver/driver means having a receiver and a driver;
   second receiver/driver means having a receiver and a driver;
   first connecting means for connecting said first receiver/driver means to said first pair of terminals;
   second connecting means for connecting said second receiver/driver means to said second pair of terminals; and,
   control means connected to said first and second receiver/driver means for maintaining said first and second receiver/driver means in a normal listening mode, for maintaining one of said receiver/driver means in said listening mode when data appears on the bus associated with said one of said receiver/driver means and for switching the other of said receiver/driver means to a transmit mode, said control means including delay means for preventing said other of said receiver/driver means from returning to said listening mode until the bus associated with said other of said receiver/driver means returns to a normal state, said delay preventing data supplied by the driver of said other of said receiver/driver means from being received by the receiver of said other of said receiver/driver means, said delay means comprising a buffer means having an output terminal means and an inverter means having an input terminal means, said buffer means output terminal means being electrically connected to said inverter input terminal means, said delay means further comprising means for providing an electrical resistance between said buffer means output terminal means and a source of a first electrical potential and means for providing an electrical capacitance between said buffer means output terminal means and a source of a second electrical potential.

* * * * *